(12) United States Patent
Kino

(10) Patent No.: US 8,902,475 B2
(45) Date of Patent: Dec. 2, 2014

(54) IMAGE FORMING APPARATUS, IMAGE PROCESSING METHOD, AND IMAGE PROCESSING SYSTEM

(75) Inventor: Tetsuro Kino, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 13/111,579

(22) Filed: May 19, 2011

(65) Prior Publication Data
US 2011/0292466 A1 Dec. 1, 2011

(30) Foreign Application Priority Data
Jun. 1, 2010 (JP) .................................. 2010-126071

(51) Int. Cl.
*H04N 1/04* (2006.01)
*G06K 15/00* (2006.01)
*G06K 15/10* (2006.01)
*H04K 1/00* (2006.01)
*H04N 1/00* (2006.01)
*H04N 1/34* (2006.01)

(52) U.S. Cl.
CPC ....... *H04N 1/00222* (2013.01); *H04N 1/00307* (2013.01); *H04N 1/00347* (2013.01); *H04N 1/346* (2013.01); *H04N 2201/0039* (2013.01); *H04N 2201/0096* (2013.01)
USPC .......... 358/474; 358/1.13; 358/1.16; 358/1.5; 380/255

(58) Field of Classification Search
USPC .................. 358/474, 1.5, 1.13, 1.16; 380/255
See application file for complete search history.

(56) References Cited

U.S. PATENT DOCUMENTS

| | | | |
|---|---|---|---|
| 2007/0094103 A1* | 4/2007 | Hyakutake et al. | 705/28 |
| 2008/0306845 A1* | 12/2008 | Murayama et al. | 705/34 |
| 2009/0077216 A1 | 3/2009 | Rhodes et al. | |
| 2010/0067035 A1* | 3/2010 | Kawakubo et al. | 358/1.13 |

FOREIGN PATENT DOCUMENTS

JP 2002-041401 2/2002

* cited by examiner

*Primary Examiner* — Marivelisse Santiago Cordero
*Assistant Examiner* — Temitayo Folayan
(74) *Attorney, Agent, or Firm* — IPUSA, PLLC

(57) ABSTRACT

An image forming apparatus includes a storage unit, a request reception unit configured to receive a scanning request requesting to scan an image, a scanning execution unit configured to execute a scanning process to scan the image based on the scanning request and thereby to obtain image data, and a transmitting unit. The transmitting unit is configured to determine whether to transmit the obtained image data to an information processing apparatus corresponding to first identification information specified in the scanning request based on a charging scheme of a communication service specified in the scanning request, to transmit the obtained image data to the information processing apparatus if it is determined to transmit the image data, and to store the image data in the storage unit if it is determined not to transmit the image data.

16 Claims, 12 Drawing Sheets

FIG.7

| USER ID | WIDGET INFORMATION URL |
|---------|------------------------|
| USER A  | http://xxxxxxx         |
| USER B  | ...                    |
|         |                        |

| WIDGET ID | scan001 |
|-----------|---------|
| USER ID | USER A |
| LINKED FUNCTION IDENTIFIER | scan |
| WIDGET ADDRESS | http://xxx/xxx/yyy |
| DISPLAY NAME | SCANNING |
| CHARGING SCHEME | PAY-AS-YOU-GO |
| SCAN SETTING INFORMATION | ... |

| WIDGET ID | scan001 |
| USER ID | USER A |
| LINKED FUNCTION IDENTIFIER | scan |
| WIDGET ADDRESS | http://xxx/xxx/yyy |
| DISPLAY NAME | SCANNING |
| CHARGING SCHEME | PAY-AS-YOU-GO |
| SCAN SETTING INFORMATION | ... |
| WIDGET RELAY URL | http://yyyyyyyyy |

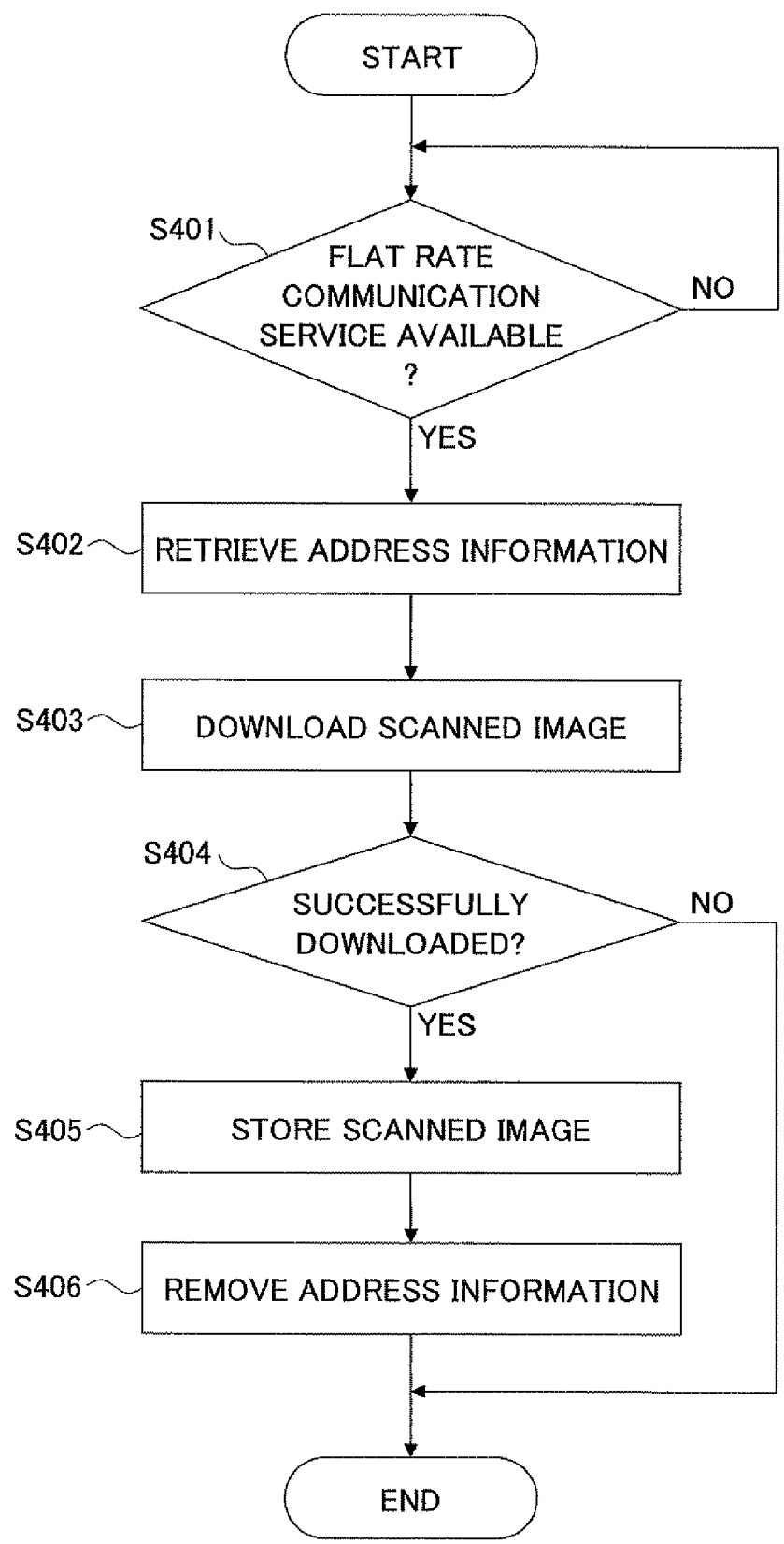

IMAGE FORMING APPARATUS, IMAGE PROCESSING METHOD, AND IMAGE PROCESSING SYSTEM

CROSS-REFERENCE TO RELATED APPLICATION

The present application is based upon and claims the benefit of priority of Japanese Patent Application No. 2010-126071, filed on Jun. 1, 2010, the entire contents of which are incorporated herein by reference.

BACKGROUND OF THE INVENTION

1. Field of the Invention

A certain aspect of this disclosure relates to an image forming apparatus, an image processing method, and an image processing system.

2. Description of the Related Art Japanese Laid-Open Patent Publication No. 2002-041401, for example, discloses a technology for transferring image data obtained by scanning an image at an image forming apparatus to a mobile terminal via a network. Such a technology enables a user to easily transfer image data obtained by using a high-performance scanner of an image forming apparatus to a mobile terminal.

However, in an environment where only a mobile communication network employing a packet-based charging scheme is available, transferring image data from the image forming apparatus to the mobile terminal incurs considerable costs. Generally, transferring image data obtained by an image forming apparatus requires a large number of packets. For example, one page of an A3-size color document scanned at a resolution of 400 dpi as a photographic image may have a data size of about 5 MB, and the data size of 100 pages of the same document becomes as large as 500 MB. Accordingly, depending on the fee structure of the mobile communication network, the communication costs may become very high.

SUMMARY OF THE INVENTION

According to an aspect of this disclosure, there is provided an image forming apparatus including a storage unit, a request reception unit configured to receive a scanning request requesting to scan an image, a scanning execution unit configured to execute a scanning process to scan the image based on the scanning request and thereby to obtain image data, and a transmitting unit. The transmitting unit is configured to determine whether to transmit the obtained image data to an information processing apparatus corresponding to first identification information specified in the scanning request based on a charging scheme of a communication service specified in the scanning request, to transmit the obtained image data to the information processing apparatus if it is determined to transmit the image data, and to store the image data in the storage unit if it is determined not to transmit the image data.

BRIEF DESCRIPTION OF THE DRAWINGS

FIG. 7 is a table showing an exemplary configuration of a user management table;

FIG. 8 is a table showing exemplary widget information of a scanning widget;

FIG. 14 is a flowchart showing a process performed by a scanning widget to obtain a scanned image based on address information.

DESCRIPTION OF THE PREFERRED EMBODIMENTS

Figure 1:
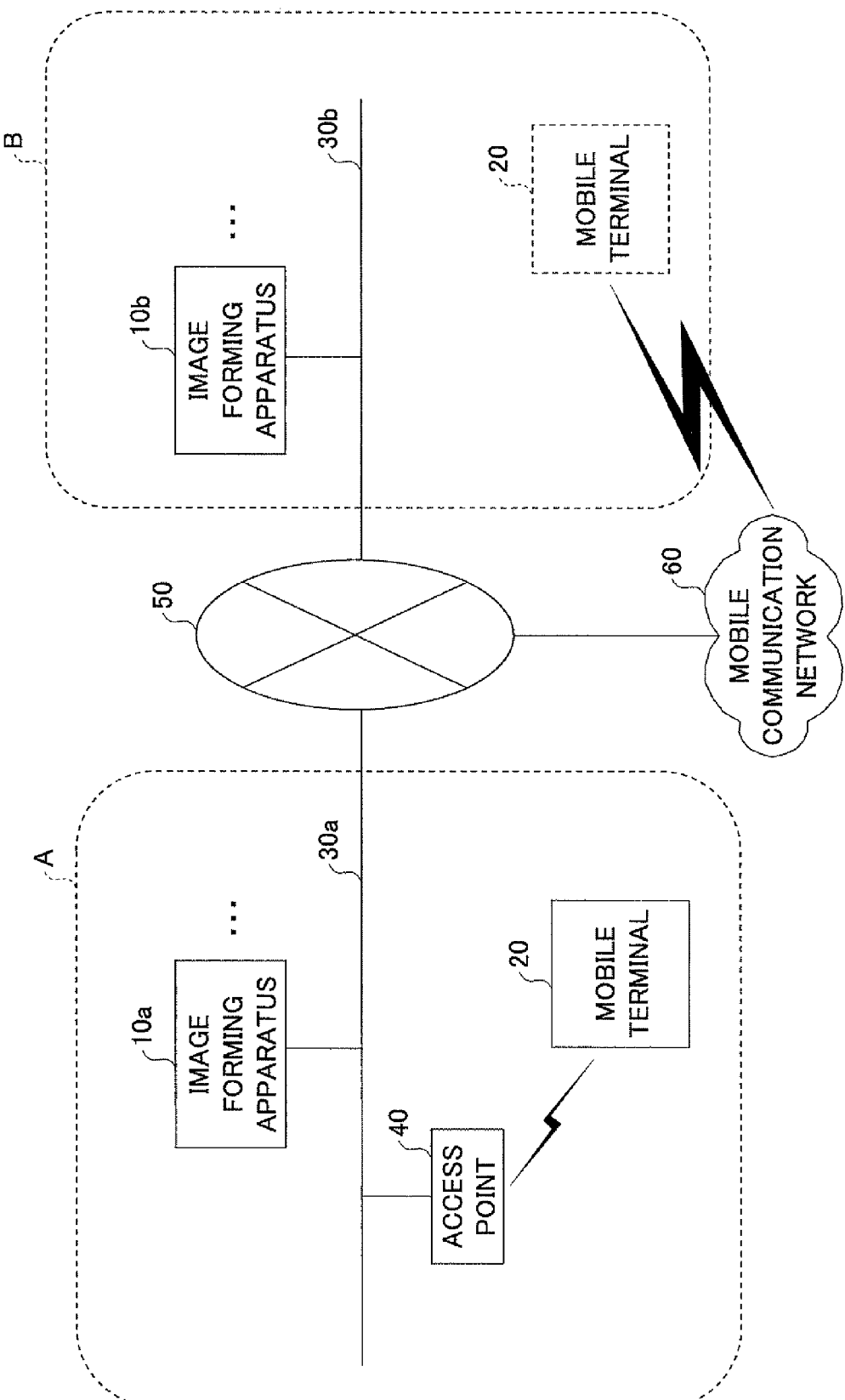
FIG. 1 is a drawing illustrating an exemplary configuration of an image processing system according to an embodiment of the present invention.

Preferred embodiments of the present invention are described below with reference to the accompanying drawings. FIG. 1 is a drawing illustrating an exemplary configuration of an image processing system according to an embodiment of the present invention. As illustrated in FIG. 1, the image processing system includes a system environment A and a system environment B.

The system environment A represents, for example, an office where a user normally works. The system environment B represents, for example, an office the user is visiting. The system environment A and the system environment B are connected to each other via a wide area network 50 such as the Internet. For example, the system environment A is present in a head office of a company A for which the user works, and the system environment B is present in a branch office of the company A.

The system environment A includes one or more image forming apparatuses 10a (may be expressed in the singular form for descriptive purposes) and at least one access point 40 that are connected to each other via a network 30a such as a local area network (LAN).

The image forming apparatus 10a may be, for example, a multifunction peripheral including multiple functions such as printing, scanning, and copying. Alternatively, the image forming apparatus 10a may be a scanner.

The access point 40 is a wireless LAN access point. In the system environment A, a mobile terminal 20 of the user is capable of communicating with the image forming apparatus 10a via the access point 40.

The mobile terminal 20 may be, for example, a portable information processing device such as a personal digital assistant (PDA) or a smartphone. Any device that supports both packet communications via a mobile communication network and communications via a network other than the mobile communication network may be used as the mobile terminal 20. In this embodiment, it is assumed that the network other than the mobile communication network is a wireless LAN. However, the network other than the mobile communication network may be a wired LAN or any other type of network or communication channel.

The system environment B includes one or more image forming apparatuses 10b (may be expressed in the singular form for descriptive purposes) connected to a network 30b such as a LAN. No wireless LAN access point is provided in the system environment B. In the system environment B, the mobile terminal 20 is able to communicate with the image forming apparatus 10b via a communication service provided by a mobile communication network 60 and the network 50.

When there is no need to distinguish between the image forming apparatuses 10a and 10b (e.g., when their common features or configurations are described), the image forming apparatuses 10a and 10b may be called the image forming apparatuses 10 or the image forming apparatus 10.

Figure 2:
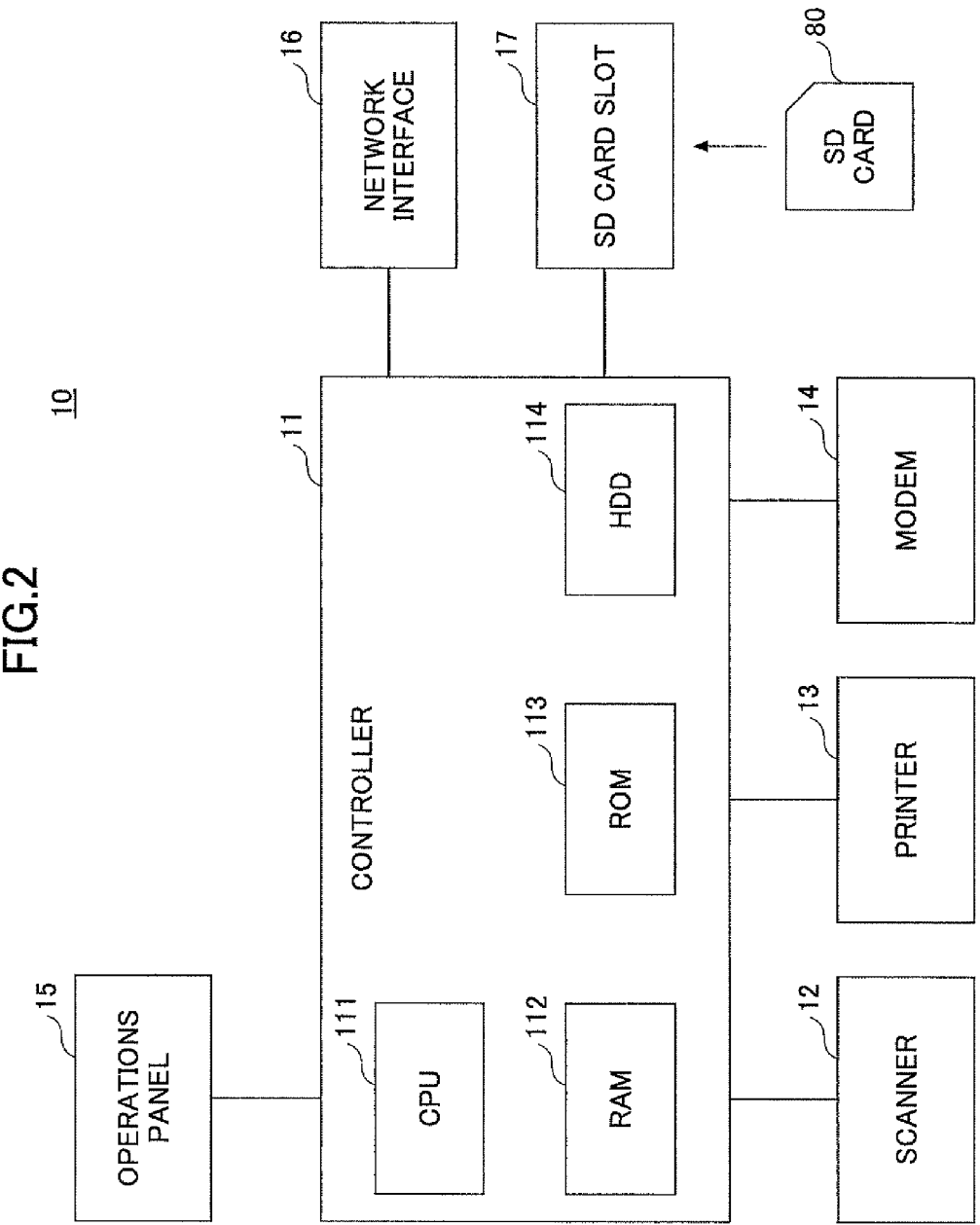
FIG. 2 is a block diagram illustrating an exemplary hardware configuration of an image forming apparatus.

Hardware configurations of the image forming apparatus 10 and the mobile terminal 20 are described below. FIG. 2 is a block diagram illustrating an exemplary hardware configuration of the image forming apparatus 10 of this embodiment. As illustrated in FIG. 2, the image forming apparatus 10 may include, as hardware components, a controller 11, a scanner 12, a printer 13, a modem 14, an operations panel 15, a network interface 16, and an SD card slot 17.

The controller 11 may include a CPU 111, a RAM 112, a ROM 113, and an HDD 114. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs.

The scanner 12 is hardware for scanning a document to obtain image data. The printer 13 is hardware for printing print data on a recording medium such as paper. The modem 14 is hardware for connecting the image forming apparatus 10 to a telephone line and is used to send and receive image data for facsimile communications. The operations panel 15 is hardware including an input unit such as buttons for receiving user inputs and a display unit such as a liquid crystal display panel. The network interface 16 is hardware for connecting the image forming apparatus 10 to a (wired or wireless) network such as a LAN. The SD card slot 17 reads, for example, programs stored in an SD card 80. Thus, with the image forming apparatus 10 of this embodiment, in addition to the programs stored in the ROM 113, programs stored in the SD card 80 can be loaded into the RAM 112 and executed. Instead of the SD card 80, any other storage medium (e.g., a CD-ROM or a universal serial bus (USB) memory) may be used for this purpose. In such a case, the SD card slot 17 may be replaced with a hardware component corresponding to the storage medium used.

Figure 3:
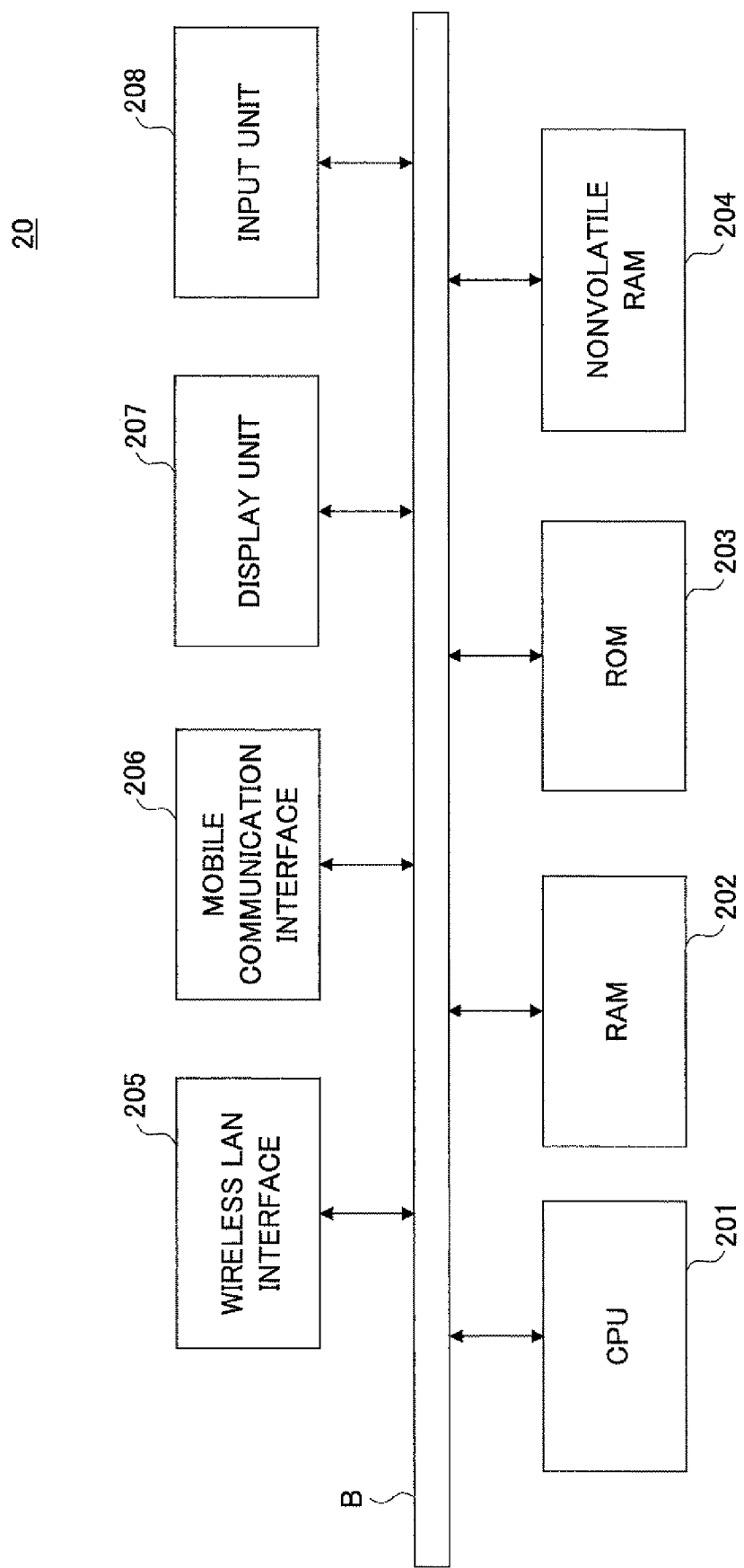
FIG. 3 is a block diagram illustrating an exemplary hardware configuration of a mobile terminal.

FIG. 3 is a block diagram illustrating an exemplary hardware configuration of the mobile terminal of this embodiment. As illustrated in FIG. 3, the mobile terminal 20 may include a CPU 201, a RAM 202, a ROM 203, a nonvolatile RAM 204, a wireless LAN interface 205, a mobile communication interface 206, a display unit 207, and an input unit 208 that are connected to each other via a bus B.

Programs for causing the mobile terminal 20 to perform processes as described below may be installed in the ROM 203 or the nonvolatile RAM 204. When the programs are installed before the shipment of the mobile terminal 20, they are generally installed in the ROM 203. Meanwhile, when the programs are downloaded via wireless communications using the wireless LAN interface 205 or the mobile communication interface 206, the programs are generally installed in the nonvolatile RAM 204. In addition to the programs, the ROM 203 and the nonvolatile RAM 204 may store various data used by the programs. The RAM 202 temporarily stores the programs retrieved from the ROM 203 or the nonvolatile RAM 204 when the programs are executed. The CPU 201 performs functions of the mobile terminal 20 according to the programs temporarily stored in the RAM 202.

The wireless LAN interface 205 is hardware for wireless LAN communications. The mobile communication interface 206 is hardware for communications via the mobile communication network 60. The display unit 207 is, for example, a liquid crystal panel and displays information output by the programs. The input unit 208 includes, for example, buttons and receives user inputs.

Figure 4:
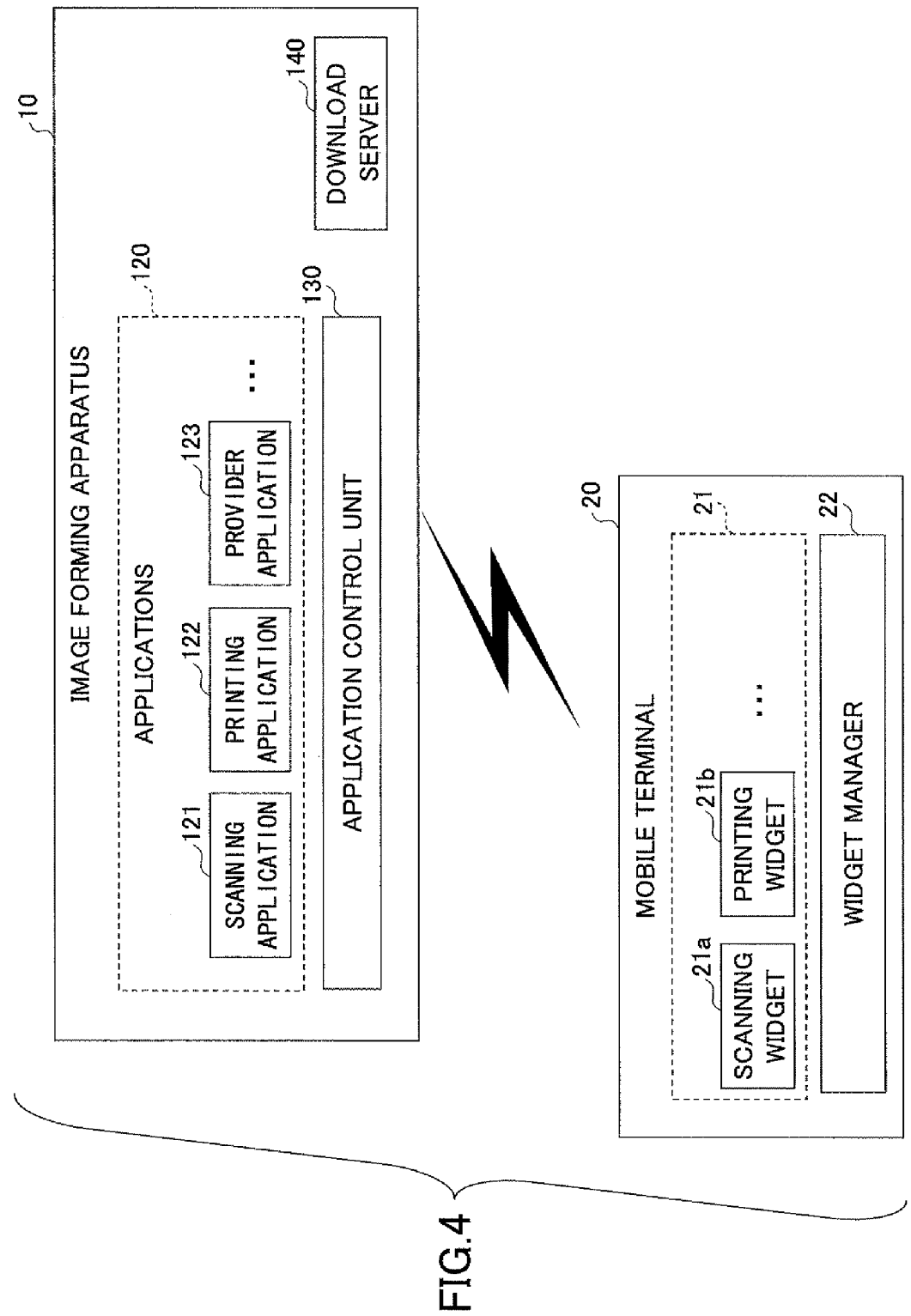
FIG. 4 is a block diagram illustrating exemplary software configurations of a mobile terminal and an image forming apparatus.

Software configurations of the image forming apparatus 10 and the mobile terminal 20 are described below. FIG. 4 is a block diagram illustrating exemplary software configurations of the mobile terminal 20 and the image forming apparatus 10.

As illustrated in FIG. 4, the mobile terminal 20 may include a scanning widget 21a, a printing widget 21b, and a widget manager 22 as software components.

The scanning widget 21a and the printing widget 21b are examples of application programs that are collectively called widgets 21 in this embodiment. In these years, simple application programs are often called widgets or gadgets. In this embodiment, application programs that can be easily installed and used are called the widgets 21. However, the term "widget" does not limit the technical scope of the application programs. The widgets 21 of this embodiment provide predetermined services (e.g., perform process flows or workflows) by remotely using functions of the image forming apparatus 10.

The scanning widget 21a, for example, performs a process to cause the image forming apparatus 10 to scan a document to obtain image data and to transfer the obtained image data to the mobile terminal 20. The printing widget 21b, for example, performs a process to cause the image forming apparatus 10 to print input document data.

The widget manager 22 provides a framework for the widgets 21 and interfaces communications between the widgets 21 and the image forming apparatus 10. Each of the widgets 21 may include an interface and a protocol defined by the widget manager 22. In other words, the widgets 21 of this embodiment are application programs that operate in cooperation with the widget manager 22.

The image forming apparatus 10 may include applications 120, an application control unit 130, and a download server 140 as software components. The applications 120 are programs that perform jobs requested by the user. In the exemplary configuration illustrated in FIG. 4, the applications 120 include a scanning application 121, a printing application 122, and a provider application 123. The scanning application 121 performs a scan job. The printing application 122 performs a print job. The provider application 123 performs a process to enable collaboration between the image forming apparatus 10 and the widgets 21 (precisely speaking, the widget manager 22).

The application control unit 130 controls the applications 120. For example, the application control unit 130 switches active applications 120 according to instructions from the user. An active application 120 indicates one of the applications 120 the operation screen of which is currently displayed on the operations panel 15 of the image forming apparatus 10 (i.e., one of the applications 120 that is currently operable via the operations panel 15).

The download server 140 transmits (returns) data stored in the HDD 114 of the image forming apparatus 10 in response to a download request. For example, the download server 140 may be implemented by a Web server or a file transfer protocol (FTP) server.

Figure 5:
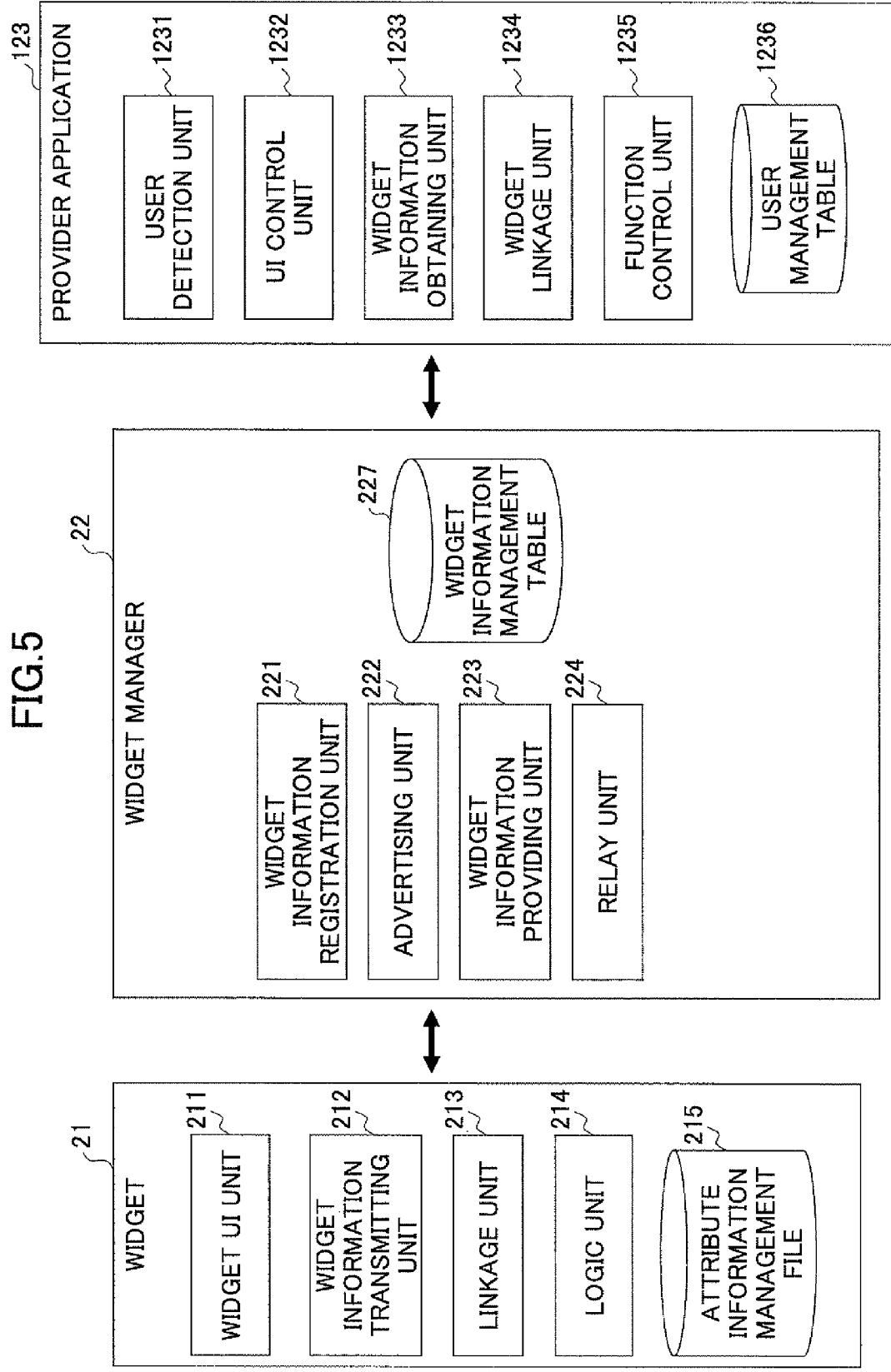
FIG. 5 is a block diagram illustrating exemplary functional configurations of a widget, a widget manager, and a provider application.

The widget 21, the widget manager 22, and the provider application 123 are described below in more detail. FIG. 5 is a block diagram illustrating exemplary functional configurations of the widget 21, the widget manager 22, and the provider application 123.

As illustrated in FIG. 5, the widget 21 may include a widget UI unit 211, a widget information transmitting unit 212, a linkage unit 213, a logic unit 214, and an attribute information management file 215.

The widget UI unit 211 displays various screens related to the widget 21 on the display unit 207 of the mobile terminal 20. The widget information transmitting unit 212 transmits a widget information registration request requesting registration of widget information to the widget manager 22 when the widget 21 is started. The widget information includes information necessary to execute the widget 21. The linkage unit 213 controls communications (e.g., transmission and reception of information) with the widget manager 22. The attribute information management file 215 contains configuration information for the widget 21. The logic unit 214 implements functions unique to the widget 21. In the present application, the logic unit 214 may correspond to an image data obtaining unit. For example, the logic unit 214 of the scanning widget 21a performs a process for storing scanned image data.

The widget manager 22 may include a widget information registration unit 221, an advertising unit 222, a widget information providing unit 223, a relay unit 224, and a widget information management table 227.

The widget information registration unit 221 receives the widget information and the widget information registration request from the widget 21 and stores the widget information in the widget information management table 227. The widget information management table 227 stores sets of widget information of the widgets 21 running on the mobile terminal 20 and is present, for example, in the nonvolatile RAM 204 of the mobile terminal 20.

The advertising unit 222 advertises (broadcasts or multicasts), for example, a user ID contained in the widget information received by the widget information registration unit 221 via the network. The advertisement is issued for each user (each user ID). Accordingly, the advertisement issued by the advertising unit 222 is used to report to the image forming apparatus 10 new entry of a user allowed to use one or more widgets 21. Alternatively, the advertisement may be issued for each set of widget information. In this case, the image forming apparatus 10 may be configured to combine or remove duplicate advertisements issued for the same user.

In response to a request from the image forming apparatus 10, the widget information providing unit 223 provides (transmits) the widget information registered in the widget information management table 227 to the image forming apparatus 10. The relay unit 224 relays communications between the widget 21 and the provider application 123.

The provider application 123 may include a user detection unit 1231, a UI control unit 1232, a widget information obtaining unit 1233, a widget linkage unit 1234, a function control unit 1235, and a user management table 1236.

The user detection unit 1231 detects a user allowed to use the widget 21 based on an advertisement issued by the widget manager 22 and registers, for example, a user ID contained in the advertisement in the user management table 1236. The user management table 1236 is used to manage a list of users who are allowed to use the widgets 21 on the network.

The UI control unit 1232 receives user inputs such as commands for operating the widgets 21. Thus, although the widgets 21 are located in the mobile terminal 20, they can also be operated through the operations panel 15 of the image forming apparatus 10. The widget information obtaining unit 1233 obtains, from the widget manager 22, the widget information of the widgets 21 that belong to a user (user ID) selected from the users (user IDs) registered in the user management table 1236. The widget linkage unit 1234 controls communications with the widget manager 22. In the present application, the widget linkage unit 1234 may correspond to a request reception unit and a transmitting unit. The function control unit 1235 controls execution of functions requested by the widgets 21. In the present application, the function control unit 1235 may correspond to a scanning execution unit.

Exemplary processes performed by the mobile terminal 20 and the image forming apparatus 10 are described below. Here, it is assumed that the user is visiting a branch office with the system environment B and causes the image forming apparatus 10b to scan a paper document to obtain image data and to transfer the image data to the mobile terminal 20 of the user. To initiate this exemplary process, the user starts the widget manager 22 and the scanning widget 21a on the mobile terminal 20.

Figure 6:
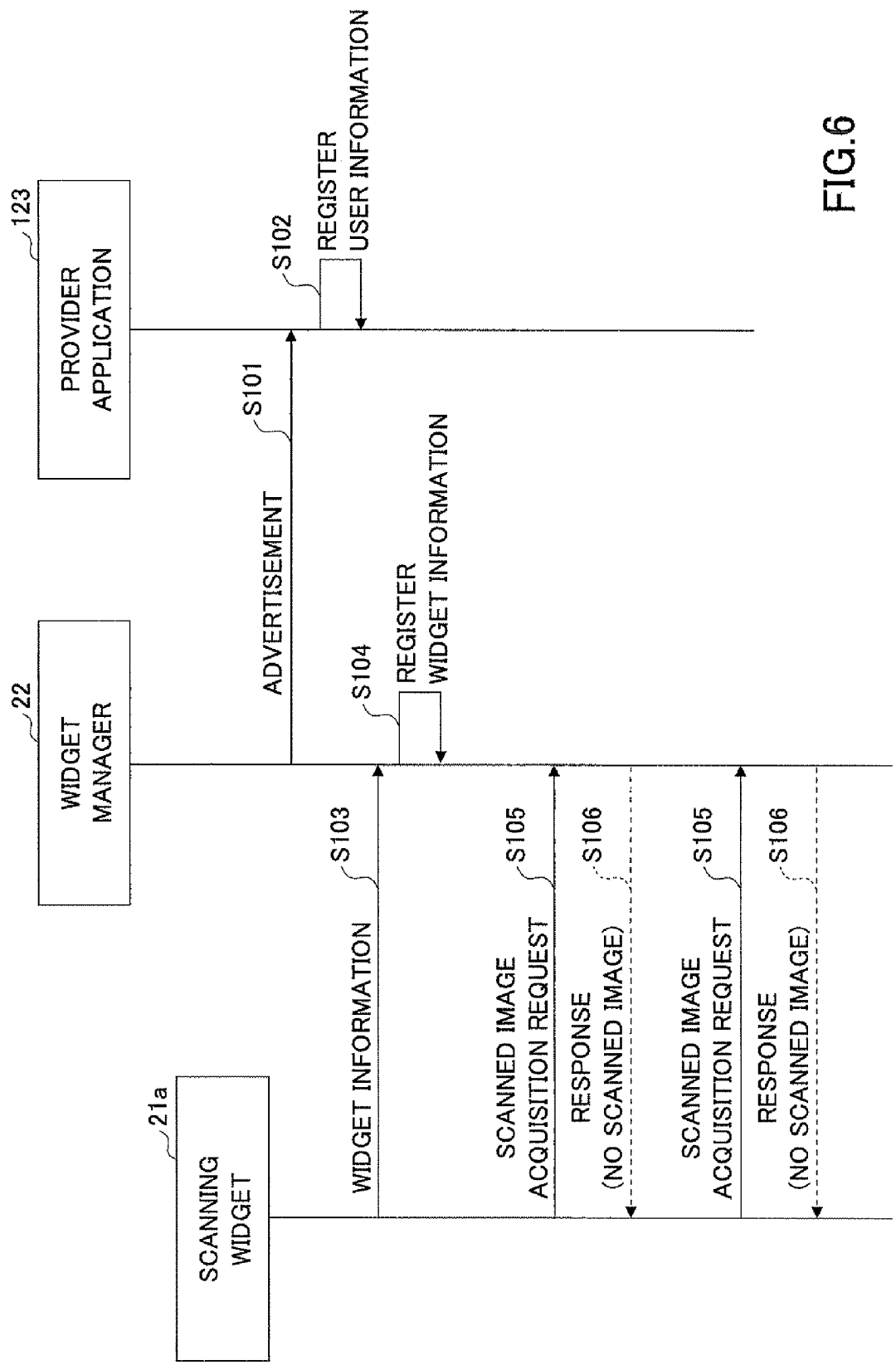
FIG. 6 is a sequence chart showing a process performed when a widget manager and a scanning widget are started.

FIG. 6 is a sequence chart showing a process performed when the widget manager 22 and the scanning widget 21a are started.

When the widget manager 22 is started by the user or automatically, the advertising unit 222 of the widget manager 22 tries to transmit an advertisement (or user information) including a user ID and a widget information URL (uniform resource locator) for obtaining the widget information via a wireless LAN using the wireless LAN interface 205. However, since no wireless LAN is provided in the system environment B, the advertising unit 222 detects that it is not possible to connect to a wireless LAN. Then, the advertising unit 222 unicasts the advertisement to a preset IP address of the image forming apparatus 10b using the mobile communication interface 206 (S101). Accordingly, the advertisement is transmitted via the mobile communication network 60, the network 50, and the network 30b to the image forming apparatus 10b.

Instead of automatically selecting the wireless LAN or the mobile communication network 60, the advertising unit 222 may be configured to select either one of them based on an external input or a setting. For example, the wireless LAN or the mobile communication network 60 may be specified in configuration information of the widget manager 22. Accordingly, in this case, the advertising unit 222 selects a communication line (or a communication service) based on the specification (or setting) in the configuration information.

The user ID, the widget information URL, and the IP address of the image forming apparatus 10b may be stored beforehand in, for example, the nonvolatile RAM 204 as the configuration information of the widget manager 22. The widget information URL is unique to the widget manager 22 (i.e., to each mobile terminal 20). Therefore, the provider application 123 of the image forming apparatus 10 can identify the widget manager 22 of a mobile terminal 20 based on the widget information URL.

When receiving the advertisement, the user detection unit 1231 of the provider application 123 registers the user ID and the widget information URL (user information) contained in the advertisement in the user management table 1236 (S102).

FIG. 7 is a table showing an exemplary configuration of the user management table 1236. As shown in FIG. 7, the user management table 1236 stores user IDs in association with widget information URLs. In this example, records for user A and user B are registered in the user management table 1236. The user management table 1236 is stored, for example, in the HDD 114.

Next, at the mobile terminal 20, the scanning widget 21a is started in response to, for example, a user input. When the scanning widget 21a is started, the widget information transmitting unit 212 of the scanning widget 21a obtains the widget information from the attribute information management file 215, transmits the widget information to the widget manager 22, and requests the widget manager 22 to register the widget information (S103). The widget information of the scanning widget 21a corresponds to a scanning request for requesting the image forming apparatus 10 to scan an image.

FIG. 8 is a table showing exemplary widget information of the scanning widget 21a. As shown in FIG. 8, the widget information of the scanning widget 21a includes a widget ID, a user ID, a linked function identifier, a widget address, a display name, a charging scheme, and scan setting information.

The widget ID is identification information for uniquely identifying the scanning widget 21a. The user ID is identification information for identifying the user of the scanning widget 21a. The linked function identifier is used to identify a function that is necessary for the image forming apparatus 10 to collaborate with the scanning widget 21a. In other words, the linked function identifier indicates a function of the image forming apparatus 10 that is to be used by the scanning widget 21a. Examples of linked function identifiers include "print" indicating a printing function and "scan" indicating a scanning function. The scanning widget 21a uses the scanning function of the image forming apparatus 10b, and therefore "scan" is specified as the linked function identifier in FIG. 8. The widget address is identification information (e.g., a URL) for uniquely identifying the scanning widget 21a in network communications. The display name is a character string to be displayed as the name of the scanning widget 21a.

The charging scheme indicates a billing method for a communication line (or a communication service) used for communications with the image forming apparatus 10b. In this embodiment, "pay-as-you-go" or "flat rate" can be specified for the charging scheme. In the "pay-as-you-go" scheme, the charge increases as the amount of traffic increases. In the "flat rate" scheme, the charge is constant (including a case where the charge is zero) regardless of the amount of traffic. In this embodiment, it is assumed that the "pay-as-you-go" scheme is employed for the mobile communication network 60 and the "flat rate" scheme is employed for the wireless LAN. However, the "flat rate" scheme may be employed for the mobile communication network 60. Also, correspondence information indicating the correspondence between communication lines or communication services (e.g., the mobile communication network 60 and the wireless LAN) and charging schemes may be stored beforehand, for example, in the nonvolatile RAM 204 of the mobile terminal 20. In this case, the widget information transmitting unit 212 determines the charging scheme based on the used communication line (or communication service) and the correspondence information.

In the exemplary process of FIG. 6, it is assumed that the mobile communication network 60 is used for communications and the "pay-as-you-go" scheme is employed for the mobile communication network 60. Accordingly, "pay-as-you-go" is specified for the charging scheme in the widget information.

The widget information transmitting unit 212 may be configured to determine the communication line (or the communication service) used for communications based on the detection result of the advertising unit 222 or by detecting by itself whether the wireless LAN is available. Also, similarly to the advertising unit 222 of the widget manager 22, the widget information transmitting unit 212 may be configured to determine the communication line based on an external input or a setting. For example, the wireless LAN or the mobile communication network 60 may be specified in the attribute information management file 215. In this case, the widget information transmitting unit 212 determines a communication line (the wireless LAN or the mobile communication network 60) based on the specification (or setting) in the attribute information management file 215.

The scan setting information includes parameters such as a resolution and a color mode (e.g., color or monochrome) regarding the scanning function.

The widget information (see FIG. 8) transmitted from the widget information transmitting unit 212 of the scanning widget 21a is received by the widget information registration unit 221 of the widget manager 22. The widget information registration unit 221 registers the received widget information in the widget information management table 227 (S104).

After transmitting the widget information, the scanning widget 21a performs polling to determine whether an image has been scanned to obtain image data and waits for reception of the image data. More specifically, the linkage unit 213 of the scanning widget 21a transmits a scanned image acquisition request for requesting the image data (the scanned image) to the relay unit 224 of the widget manager 22 (S105). The relay unit 224 returns a response to the scanned image acquisition request (S106). Since the image has not been scanned at this stage, the relay unit 224 returns a response indicating that there is no scanned image. The linkage unit 213 repeatedly transmits the scanned image acquisition request at predetermined intervals (S105). The scanned image acquisition request may include the widget ID.

After starting the scanning widget 21a on the mobile terminal 20, the user moves to a location where the image forming apparatus 10b is installed to use the scanning widget 21a. Here, the same advertisement may be transmitted to multiple image forming apparatuses 10b. In this case, the user detection units 1231 of the multiple image forming apparatuses 10b receive the advertisement and register the user ID and the widget information URL in the user management tables 1236. Accordingly, in this case, the user can use the scanning widget 21a on any one of the image forming apparatuses 10b.

Figure 9:
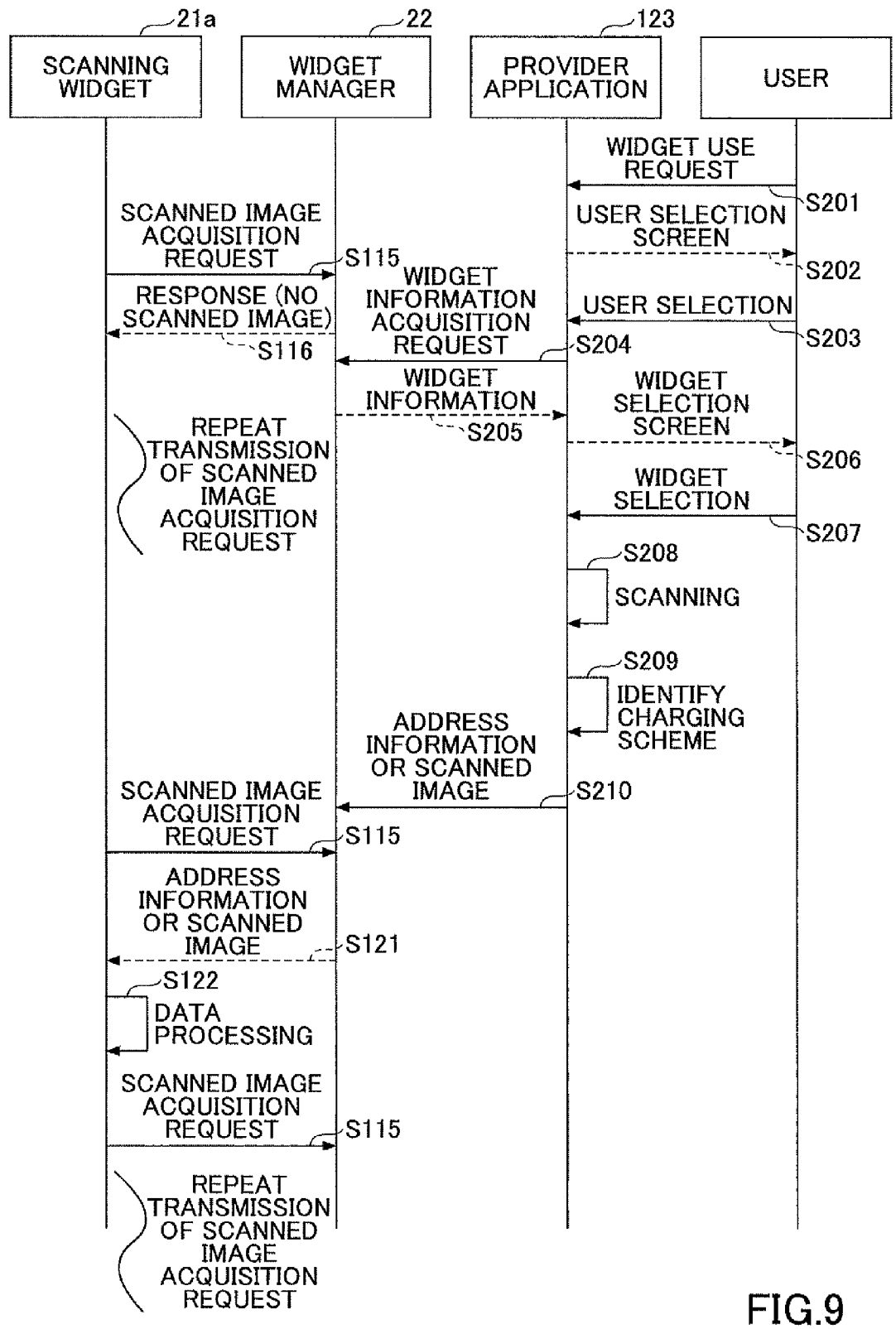
FIG. 9 is a sequence chart showing a process performed when a scanning widget is executed.

Next, a process performed in response to user operations on the image forming apparatus 10b is described. FIG. 9 is a sequence chart showing a process performed when the scanning widget 21a is executed. In FIG. 9, it is assumed that the provider application 123 and the widget manager 22 communicate with each other via the mobile communication network 60.

When the user inputs a request (widget use request) to use the provider application 123 via the operations panel 15 of the image forming apparatus 10b, the application control unit 120 causes the provider application 123 to transition into an active state (S201). After the transition into the active state, the UI control unit 1232 of the provider application 123 displays a user selection screen on the operations panel 15 based on information registered in the user management table 1236 (S202).

Figures 10, 11:
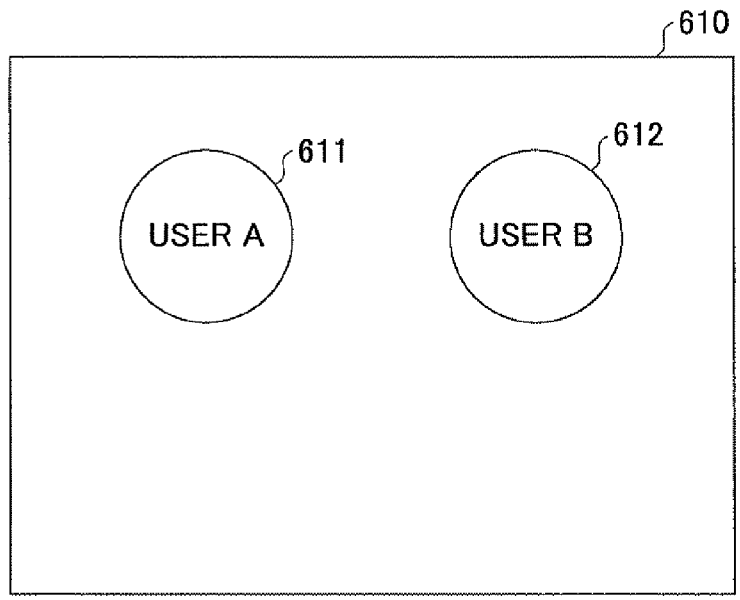
FIG. 10 is a drawing illustrating an exemplary user selection screen.
FIG. 11 is a table showing an exemplary configuration of widget information of a scanning widget which is to be transmitted from a widget manager to a provider application.

FIG. 10 illustrates an exemplary user selection screen 610. The user selection screen 610 includes buttons for respective user IDs. In this example, a button 611 for a user A and a button 612 for a user B are displayed on the user selection screen 610.

On the user selection screen 610, the user selects and presses one of the buttons corresponding to the user ID of the user (S203). Then, the widget information obtaining unit 1233 obtains the widget information URL associated with the user ID corresponding to the pressed button from the user management table 1236. Here, user authentication may be performed based on the user ID corresponding to the pressed button and the subsequence process may be performed only when the user is successfully authenticated.

Next, the widget information obtaining unit 1233 transmits a widget information acquisition request for requesting the widget information to the obtained widget information URL (S204). The widget information acquisition request is received by the widget information providing unit 223 of the widget manager 22. In response, the widget information providing unit 223 obtains sets of widget information registered in the widget information management table 227 and transmits the sets of widget information to the provider application 123 (S205). Prior to the transmission of the sets of the widget information, the widget information providing unit 223 generates URLs (hereafter called widget relay URLs) that are unique to the respective widgets 21 (or the sets of widget information). The widget information relay URLs are used to relay communications between the provider application 123 and the widgets 21. The widget information providing unit 223 attaches the widget relay URLs to the sets of widget information of the corresponding widgets 21 and transmits the sets of widget information with the widget relay URLs to the provider application 123. For example, the widget information transmitted in step S205 may have a configuration as shown in FIG. 11.

FIG. 11 is a table showing an exemplary configuration of the widget information of the scanning widget 21a which is transmitted from the widget manager 22 to the provider application 123.

The widget information shown in FIG. 11 includes the widget relay URL in addition to the information items shown in FIG. 8. In step S205, sets of widget information as shown in FIG. 11 are transmitted. Needless to say, there is a case where only one set of widget information is transmitted.

Next, the UI control unit 1232 of the provider application 123 stores the received sets of widget information in the RAM 112 and displays a screen (widget selection screen) based on the sets of widget information (S206). The widget selection screen includes a list of widgets 21 available for the user.

Figure 12:
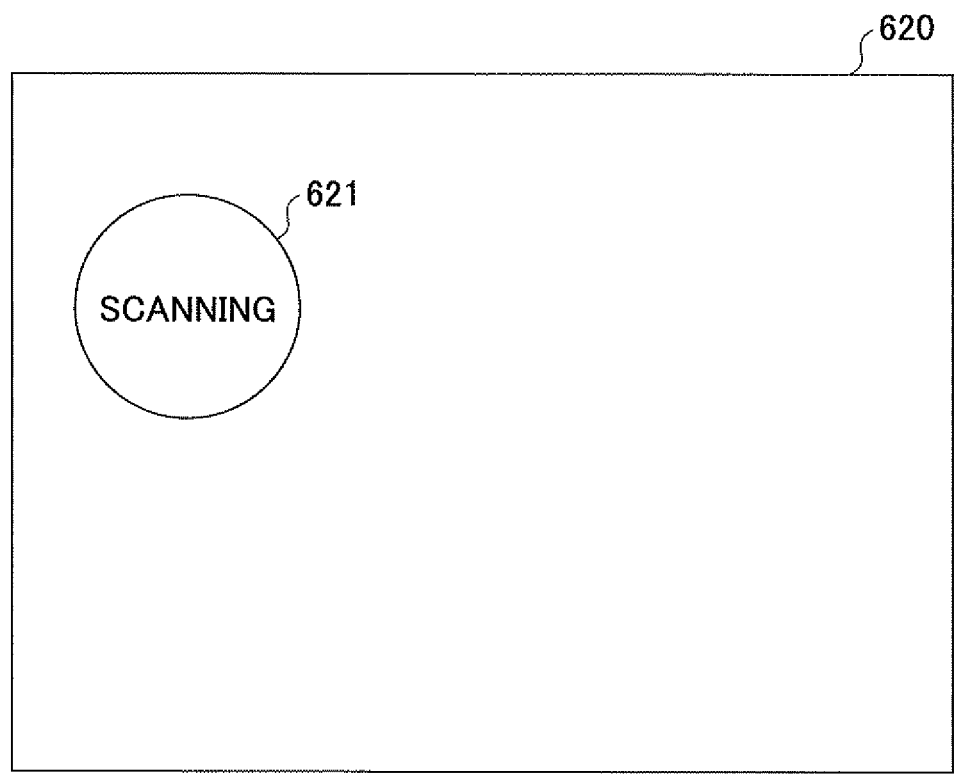
FIG. 12 is a drawing illustrating an exemplary widget selection screen.

FIG. 12 is a drawing illustrating an exemplary widget selection screen 620. On the widget selection screen 620, a button 621 corresponding to the scanning widget 21a is displayed. Here, if widgets 21 (e.g., the printing widget 21b) other than the scanning widget 21a have also been started on the mobile terminal 20, the widget information of the other widgets 21 is also transmitted to the provider application 123. In this case, buttons corresponding to the other widgets 21 are also displayed on the widget selection screen 620.

When a document is set on the image forming apparatus 10b and the button 621 corresponding to the scanning widget 21a is selected on the widget selection screen 620 (S207), the widget linkage unit 1234 of the provider application 123 determines to perform a scanning process based on the linked function identifier (in this example, "scan") in the widget information (hereafter called current widget information) corresponding to the selected button 621. Then, the widget linkage unit 1234 requests the function control unit 1235 to perform the scanning process.

The function control unit 1235 controls the scanning process based on the scan setting information in the current widget information (S208). More specifically, the function control unit 1235 causes the scanner 12 to scan the document set on the image forming apparatus 10b to obtain a scanned image (image data) and outputs the scanned image to the widget linkage unit 1234. For example, the scanned image may be generated in a joint photographic experts group (JPEG) format, a tagged image file format (TIFF), or a portable document format (PDF).

Next, the widget linkage unit 1234 identifies the charging scheme specified in the current widget information (S209). Depending on the identified charging scheme, the widget linkage unit 1234 transmits the scanned image itself or identification information (in this embodiment, address information or location information) of the scanned image to the widget relay URL in the current widget information (S210). For example, when the charging scheme is "pay-as-you-go", the widget linkage unit 1234 stores the scanned image in a predetermined location (e.g., a folder) in the HDD 114 and transmits address information (e.g., a URL) indicating the location to the widget relay URL. Thus, in this case, the widget linkage unit 1234 does not transmit the scanned image itself.

Meanwhile, when the charging scheme is "flat rate", the widget linkage unit 1234 transmits the scanned image itself to the widget relay URL.

In the exemplary process of FIG. 9, it is assumed that "pay-as-you-go" is specified for the charging scheme. Therefore, the widget linkage unit 1234 transmits the address information indicating the location of the scanned image stored in the HDD 114 to the widget relay URL.

The address information or the scanned image transmitted to the widget relay URL is received by the relay unit 224 of the widget manager 22. When receiving a scanned image acquisition request from the scanning widget 21a corresponding to the widget relay URL (S115) after the address information or the scanned image is received, the relay unit 224 transfers the address information or the scanned image to the linkage unit 213 of the scanning widget 21a (S121).

When receiving the address information or the scanned image, the linkage unit 213 inputs the address information or the scanned image to the logic unit 214. The logic unit 214 performs a predefined process (data processing) on the address information or the scanned image (S122). For example, when receiving the scanned image, the logic unit 214 stores the scanned image in a storage location (e.g., the nonvolatile RAM 204) specified in the attribute information management file 215. Meanwhile, when receiving the address information, the logic unit 214 stores the address information in a storage location (e.g., the nonvolatile RAM 204) specified in the attribute information management file 215. The stored address information is used to obtain the scanned image when the wireless LAN becomes available.

Then, the linkage unit 213 resumes transmission of the scanned image acquisition request (resumes polling) in preparation for the next execution of the scanning widget 21a (S115) and waits for reception of a scanned image.

Steps S209 and S210 performed by the widget linkage unit 1234 of the provider application 123 are described in more detail with reference to FIG. 13.

Figure 13:
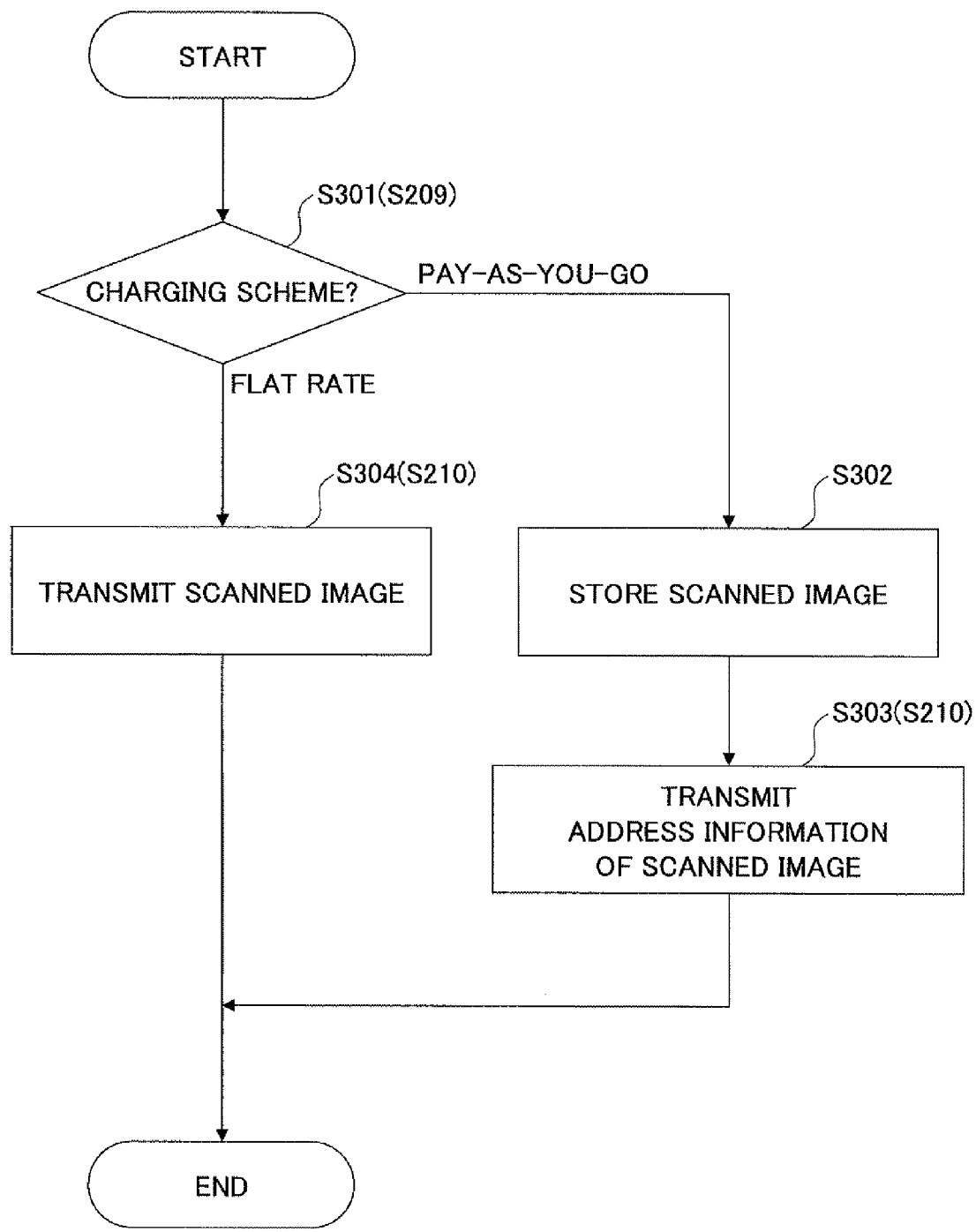
FIG. 13 is a flowchart showing a process performed on a scanned image by a widget linkage unit of a provider application.

FIG. 13 is a flowchart showing a process performed on a scanned image by the widget linkage unit 1234 of the provider application 123. In FIG. 13, step numbers enclosed in brackets indicate the corresponding step numbers in FIG. 9.

When the scanned image is output from the function control unit 1235, the widget linkage unit 1234 identifies the charging scheme specified in the current widget information (S301). When the charging scheme is "pay-as-you-go", the widget linkage unit 1234 stores the scanned image in a predetermined location (e.g., a folder) in the HDD 114 (S302). Then, the widget linkage unit 1234 transmits address information indicating the location of the scanned image to the widget relay URL in the current widget information (S303).

The address information may indicate, for example, a URL as shown below.

http://<IP address of image forming apparatus 10b>/<pathname>/<file name of scanned image>

However, the address information may be expressed in any format according to a communication protocol used in a process of obtaining the scanned image described later.

Meanwhile, when the charging scheme is "flat rate", the widget linkage unit 1234 transmits the scanned image itself to the widget relay URL (S304).

Next, a process performed by the scanning widget 21a based on the address information is described.

FIG. 14 is a flowchart showing a process performed by the scanning widget 21a to obtain the scanned image based on the address information. The process of FIG. 14 may be started, for example, after the address information is received and stored by the logic unit 214 of the scanning widget 21a. Alternatively, the logic unit 214 may be configured to determine whether address information has been stored when the scanning widget 21a is started and to start the process of FIG. 14 if the address information has been stored.

The logic unit 214 of the scanning widget 21a determines (or monitors) whether a "flat rate" communication service is available (S401). For example, in this embodiment, a wireless LAN provides a "flat rate" communication service. Therefore, the logic unit 214 determines whether a wireless LAN is available. The logic unit 214 may determine whether a wireless LAN is available according to a known method, for example, by monitoring a beacon from an access point.

When a "flat rate" communication service becomes available (YES in S401), the logic unit 214 retrieves the address information from the storage location (S402). Based on the address information, the logic unit 214 downloads the scanned image from the image forming apparatus 10b via a communication interface (e.g., the wireless LAN interface 205) corresponding to the "flat rate" communication service (S403).

More specifically, the logic unit 214 transmits a download request (acquisition request) with the address information attached. The download request is received by the download server 140 of the image forming apparatus 10b corresponding to the address information. If the scanned image corresponding to the address information is stored in the HDD 114, the download server 140 transmits (returns) the scanned image. Here, the download server 140 may be configured to remove the scanned image from the HOD 114 after transmitting the scanned image.

If the scanned image is successfully downloaded (YES in S404), the logic unit 214 stores the scanned image in a predetermined storage location (S405). Then, the logic unit 214 removes the address information from the storage location (S406).

For example, when the user (or the mobile terminal 20) returns to the system environment A, the scanned image stored in the image forming apparatus 10b is automatically downloaded to the mobile terminal 20 via the access point 40, the network 30a, and the network 50 through the process as shown in FIG. 14. Thus, the scanned image is downloaded via a "flat rate" communication service rather than a "pay-as-you-go" communication service (e.g., the mobile communication network 60). With this configuration, the communication charge for downloading the scanned image does not increase depending on the data size of the scanned image.

The process of FIG. 14 may be initiated in response to a user input.

As described above, in this embodiment, the address information of the scanned image, instead of the scanned image itself, is transmitted from the image forming apparatus 10b when only a "pay-as-you-go" communication service is available for the mobile terminal 20. The address information is character-string data and has a small data size compared with the scanned image. Therefore, this configuration makes it possible to reduce communication charges even when a "pay-as-you-go" scheme is employed for the communication service provided by the mobile communication network 60.

The provider application 123 may be configured to display the address information of the scanned image on the operations panel 15 instead of transmitting the address information to the mobile terminal 20. In this case, the user may enter the displayed address information into the mobile terminal 20 and download the scanned image based on the entered address information. The address information may be displayed on the operations panel 15, for example, as a character string or a two-dimensional code.

The widget information may also include a maximum data size (threshold) of the scanned image that is allowed to be transmitted. In this case, the widget linkage unit 1234 of the provider application 123 transmits the address information if the data size of the scanned image exceeds the threshold and transmits the scanned image itself if the data size is less than or equal to the threshold regardless of the charging scheme specified in the current widget information.

The widget linkage unit 1234 of the provider application 123 may be configured to compress the scanned image or convert the scanned image into a data format with a higher compression ratio and to transmit the compressed or converted scanned image when the charging scheme is "pay-as-you-go". In this case, the widget linkage unit 1234 may not transmit the address information.

Also, information other than the address information may be transmitted as a replacement for the scanned image itself. For example, any information (identification information) such as an image ID or a file name that can be used to identify the scanned image stored in the image forming apparatus 10b may be transmitted instead of the address information. In this case, the widget linkage unit 1234 of the provider application 123 may be configured to transmit the identification information of the scanned image together with the identification information (e.g., an IP address) of the image forming apparatus 10 where the scanned image is stored. Also, the widget manager 22 may be configured to identify the image forming apparatus 10 (i.e., to obtain the identification information of the image forming apparatus 10) that is in communication with the widget manager 22. In this case, the widget manager 22 may attach the identification information of the image forming apparatus 10 to the received identification information of the scanned image and to transfer the identification information to the scanning widget 21a.

As described above, an aspect of this disclosure makes it possible to provide an image forming apparatus, an image processing method, and an image processing system that make it possible to reduce communication charges needed to transmit scanned images.

The present invention is not limited to the specifically disclosed embodiments, and variations and modifications may be made without departing from the scope of the present invention.

What is claimed is:

1. An image forming apparatus, comprising:
   a request reception unit configured to receive a scanning request requesting to scan an image from an information processing apparatus;
   a scanning execution unit configured to execute a scanning process to scan the image based on the scanning request and thereby to obtain image data; and
   a transmitting unit configured
      to determine whether to transmit the obtained image data to the information processing apparatus which sent the scanning request of the obtained image data by the scanning execution unit or to store the obtained image data in a predetermined storage unit based on a charging scheme of a communication service used for data communication between the image forming apparatus and the information processing apparatus,
      to transmit the obtained image data to the information processing apparatus if it is determined to transmit the image data, and
      to store the image data in the predetermined storage unit if it is determined to store the image data,
      wherein a selection between a flat-rate charging scheme and a pay-as-you-go charging scheme determines whether to transmit the image data or to store the image data.

2. The image forming apparatus as claimed in claim 1, wherein if it is determined not to transmit the image data, the transmitting unit is configured to store the image data in the predetermined storage unit and transmit identification information identifying a location where the image data is stored to the information processing apparatus.

3. The image forming apparatus as claimed in claim 1, wherein
   the scanning request further includes a threshold; and
   the transmitting unit is configured to transmit the image data to the information processing apparatus regardless of the charging scheme in the scanning request if a data size of the image data is less than or equal to the threshold.

4. The image forming apparatus as claimed in claim 1, wherein the predetermined storage unit is an external device provided separate from the image forming apparatus.

5. The image forming apparatus as claimed in claim 1, wherein the charging scheme of the communication service is specified in the scanning request.

6. An image processing method performed by an image forming apparatus, the image processing method comprising:
   receiving a scanning request requesting to scan an image from an information processing apparatus;
   executing a scanning process to scan the image based on the scanning request and thereby to obtain image data; and
   determining whether to transmit the obtained image data to the information processing apparatus which sent the scanning request of the obtained image data or to store the obtained image data in a predetermined storage unit based on a charging scheme of a communication service used for data communication between the image forming apparatus and the information processing apparatus,
   transmitting the obtained image data to the information processing apparatus if it is determined to transmit the image data, and
   storing the image data in the predetermined storage unit if it is determined to store the image data,
   wherein a selection between a flat-rate charging scheme and a pay-as-you-go charging scheme determines whether to transmit the image data or to store the image data.

7. The image processing method as claimed in claim 6, wherein the predetermined storage unit is an external device provided separate from the image forming apparatus.

8. The image processing method as claimed in claim 6, further comprising specifying the charging scheme of the communication service in the scanning request.

9. An image processing system, comprising:
   an information processing apparatus; and
   an image forming apparatus that comprises
      a request reception unit configured to receive a scanning request requesting to scan an image from an information processing apparatus;
      a scanning execution unit configured to execute a scanning process to scan the image based on the scanning request and thereby to obtain image data; and
      a transmitting unit configured
         to determine whether to transmit the obtained image data to the information processing apparatus which sent the scanning request of the obtained image data by the scanning execution unit or to store the obtained image data in a predetermined storage unit based on a charging scheme of a communication service used for data communication between the image forming apparatus and the information processing apparatus,
         to transmit the obtained image data to the information processing apparatus if it is determined to transmit the image data, and
         to store the image data in the predetermined storage unit if it is determined to store the image data,
      wherein a selection between a flat-rate charging scheme and a pay-as-you-go charging scheme determines whether to transmit the image data or to store the image data.

10. The image processing system as claimed in claim 9, wherein if it is determined not to transmit the image data, the transmitting unit is configured to store the image data in the predetermined storage unit and transmit identification information identifying a location where the image data is stored to the information processing apparatus.

11. The image processing system as claimed in claim 10, wherein the information processing apparatus includes an image data obtaining unit configured to obtain the image data from the image forming apparatus based on the identification information.

12. The image processing system as claimed in claim 11, wherein the image data obtaining unit is configured
   to detect whether a communication service employing a flat rate charging scheme is available, and
   to obtain the image data from the image forming apparatus when the communication service employing the flat rate charging scheme becomes available after receiving the identification information.

13. The image processing system as claimed in claim 11, wherein the image forming apparatus further includes a downloading unit configured to transmit the image data when requested by the image data obtaining unit of the information processing apparatus.

14. The image processing system as claimed in claim 13, wherein the downloading unit is configured to remove the image data from the predetermined storage unit after transmitting the image data to the information processing apparatus.

15. The image processing system as claimed in claim 9, wherein the predetermined storage unit is an external device provided separate from the image forming apparatus.

16. The image processing system as claimed in claim 9, wherein the charging scheme of the communication service is specified in the scanning request.

* * * * *